United States Patent

(12) United States Patent
Yavuz et al.

(10) Patent No.: US 11,102,657 B2
(45) Date of Patent: Aug. 24, 2021

(54) METHOD AND APPARATUS FOR PRE-REGISTERING AND DEPLOYING BASE STATIONS/ACCESS POINTS IN A PRIVATE NETWORK

(71) Applicant: Celona, Inc., Cupertino, CA (US)

(72) Inventors: Mehmet Yavuz, Palo Alto, CA (US); Nagi Mahalingam, San Diego, CA (US)

(73) Assignee: Celona, Inc., Cupertino, CA (US)

( * ) Notice: Subject to any disclaimer, the term of this patent is extended or adjusted under 35 U.S.C. 154(b) by 43 days.

(21) Appl. No.: 16/736,713

(22) Filed: Jan. 7, 2020

(65) Prior Publication Data
US 2021/0168618 A1 Jun. 3, 2021

Related U.S. Application Data

(60) Provisional application No. 62/942,036, filed on Nov. 29, 2019.

(51) Int. Cl.
*H04W 16/14* (2009.01)
*H04W 24/02* (2009.01)
(Continued)

(52) U.S. Cl.
CPC ........... *H04W 16/14* (2013.01); *H04W 24/02* (2013.01); *H04W 48/16* (2013.01);
(Continued)

(58) Field of Classification Search
CPC ..... H04W 24/02; H04W 16/14; H04W 88/08; H04L 5/1438
See application file for complete search history.

(56) References Cited

U.S. PATENT DOCUMENTS

2008/0045234 A1* 2/2008 Reed .................. H04W 8/02
455/456.1
2017/0295497 A1* 10/2017 MacMullan .......... H04W 24/02
2021/0084658 A1* 3/2021 Sheriff ................ H04W 24/02

OTHER PUBLICATIONS

Federal Communications Commission Office of Engineering and Technology Laboratory Division, "Certification and Test Procedures for Citizens Broadband Radio Service Devices Authorized Under Part 96", Apr. 19, 2019, 940660 D01, Part 96 CBRS Eqpt v.02, 8 pgs.
(Continued)

*Primary Examiner* — Joshua L Schwartz
(74) *Attorney, Agent, or Firm* — Jaquez Land Greenhaus & McFarland LLP; Bruce W. Greenhaus, Esq.

(57) ABSTRACT

A method and apparatus for deploying Base Stations/Access Points (BS/APs) in an enterprise wireless communications network. The method is useful to deploy BS/APs in a managed radio communication environment to mitigate and prevent interference between competing transmitters in the area. The BS/APs may comprise Citizens Broadband radio Service Devices (CBSDs) deployed in 4G and 5G enterprise communications networks operating under FCC rules relating to Citizens Broadband Radio Service (CBRS). Spectrum may be managed by a Spectrum Management Entity (SME). In order to pre-register BS/APs prior to deployment, location coordinates corresponding to an enterprise address may be used. A domain proxy (DP) may request registration, obtain a spectrum grant, and maintain the grant. After installation of the BS/APs, the spectrum grant is used to make Radio Environment Monitoring (REM) measurements and determine an RF environment, which is then used to mitigate interference in the enterprise network by assigning optimized channels to each BS/AP for operation.

9 Claims, 11 Drawing Sheets

(51) Int. Cl.
*H04W 72/04* (2009.01)
*H04W 88/08* (2009.01)
*H04W 72/08* (2009.01)
*H04W 84/18* (2009.01)
*H04W 48/16* (2009.01)
*H04W 84/04* (2009.01)

(52) U.S. Cl.
CPC ..... *H04W 72/0453* (2013.01); *H04W 72/082* (2013.01); *H04W 84/045* (2013.01); *H04W 84/18* (2013.01); *H04W 88/08* (2013.01)

(56) References Cited

OTHER PUBLICATIONS

Wireless Innovation Forum, "Signaling Protocols and Procedures for Citizens Broadband Radio Service (CBRS): WInnForum Recognized CBRS Air Interfaces and Measurements", Document WINNF-SSC-0002, Version 5.0.0, Jul. 10, 2019, 13 pgs.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.4, Jun. 26, 2019, 60 pgs.

Wireless Innovation Forum, "Requirements for Commercial Operation in the U.S. 3550-3700 MHz Citizens Broadband Radio Service Band", Document WINNF-TS-0112, Version V1.9.0, Dec. 4, 2019, 81 pgs.

* cited by examiner

METHOD AND APPARATUS FOR PRE-REGISTERING AND DEPLOYING BASE STATIONS/ACCESS POINTS IN A PRIVATE NETWORK

CROSS-REFERENCE TO RELATED APPLICATIONS—CLAIM OF PRIORITY

The present application claims priority to U.S. Provisional Application No. 62/942,036, filed Nov. 29, 2019, entitled "Method and Apparatus for Pre-Registering and Deploying Base Stations/Access Points in a Private Network", which is herein incorporated by reference in its entirety.

BACKGROUND

(1) Technical Field

The disclosed method and apparatus relate to communications networks and more particularly to pre-registration, deployment and provisioning of equipment with a communications network.

(2) Background

FIG. 1 is an illustration of a basic configuration for a communication network 100, such as a "4G LTE" (fourth generation Long-Term Evolution) or "5G NR" (fifth generation New Radio) network, in which user equipment (UE) 101 communicates with a base station/access point (BS/AP) 103. One of the advantages of such networks is their ability to provide communications to and from multiple wireless devices and provide these wireless devices with access to a large number of other devices and services via the wireless connections to the BS/AP 103 of the network 100.

As used herein, the term "UE' refers to a wide range of user devices having wireless connectivity, such as a cellular mobile phone, an Internet of Things (IOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases they may be installed at a fixed location. For example, a factory sensor may be installed at a fixed location from which it can remotely monitor an assembly line or a robotic arm's movement.

Used herein, the term 'BS/AP" is used broadly to include base stations and access points, including at least an extended NodeB (eNB) of an LTE/5G network, a cellular base station (BS), a Citizens Broadband Radio Service Device (CBSD) (which may be an LTE or 5G device), a WiFi access node, a Local Area Network (LAN) access point, a Wide Area Network (WAN) access point, and should also be understood to include other network receiving hubs that provide access to a network of a plurality of wireless transceivers within range of the BS/AP. Typically, the BS/APs are used as transceiver hubs, whereas the UEs are used for point to point communication and are not used as hubs. Therefore, the BS/APs transmit at a relatively higher power than the UEs.

The BS/APs provide the UEs with a connection to another network, which in this example is in the Core Network 105. One function of the Core Network 105 is to provide the UE 101 and the BS/AP 103 with access to other devices and services either within its network, or on other networks. Particularly, in cellular networks and in private networks, the BS/AP 103 can receive signals from, and send signals to, the UE 101. The BS/AP 103 is coupled to the core network 105; therefore, the BS/AP provides a connection that allows information to flow between the cellular or private network and other networks, such as the Public Switched Telephone Network (PSTN) or the Internet 107. Wireless data transmission between a UE 101 and the BS/AP 103 occurs on an assigned channel, such as a specific frequency. Data transmission between the BS/AP 103 and the Core Network 105 utilizes any appropriate communication means; e.g., wireless, cable, fiber optic, and so forth.

In addition to providing access to remote networks and allowing information to flow between the cellular network and the internet 107, the core network 105 provides control of the air interface between the base station 103 and the UEs 101. The Core Network 105 may also coordinate the BS/APs to minimize interference within the network.

Recently, the US Federal Government finalized rules (Rule 96) that allow general access to an area of the frequency spectrum referred to as the CBRS. CBRS, which is a key element of an advanced communication network referred to as "5G", operates in a 150 MHz wide frequency range from 3.55 GHz to 3.7 GHz. The CBRS rules set forth detailed requirements for the devices that operate in a CBRS network and how they communicate. CBRS supports both LTE and 5G devices. Base stations within a CBRS network are termed "CBSDs", and UEs are termed End User Devices (EUDs). CBSDs are fixed Stations, or networks of such stations, that operate on a Priority Access or General Authorized Access basis in the Citizens Broadband Radio Service consistent with Title 47 CFR Part 96 of the United States Code of Federal Regulations (CFR). For CBSDs that comprise multiple nodes or networks of nodes, CBSD requirements apply to each node, even if network management and communication with the SAS is accomplished via a single network interface.

The CBRS rules require that a Spectrum Access System (SAS) allocate spectrum to the CBSDs to avoid interference within the CBRS band. Generally, the SAS authorizes and manages use of spectrum for the CBRS. More specifically, the SAS maintains records of all authorized services and CBSDs in the CBRS frequency bands, is capable of determining the available channel at a specific geographic location, provides information on available channels to CBSDs that have been certified under the Commission's equipment authorization procedures, determines and enforces maximum power levels for CBSDs, enforces protection criteria for Incumbent Users and Priority Access Licensees, and performs other functions as set forth in the Federal Communications Commission (FCC) rules.

The Spectrum Sharing Committee Work Group 3 (for CBRS Protocols) has established an interface specification for registering a CBSD, requesting a grant of spectrum, and maintaining that grant. These message flows are described in the document titled "Signaling Protocols and Procedures for Citizens Broadband Radio Service (CBRS): Spectrum Access System (SAS)-Citizens Broadband Radio Service Device (CBSD) Interface Technical Specification", Document WINNF-TS-0016-V1.2.4. 26 Jun. 2019.

FIG. 2 is a message flow diagram that shows messages between the CBSD, SAS and user portal (or Certified Professional Installer (CPI)), in accordance with the interface specification. A CPI is any individual trained and currently validly certified from an accredited CPI Training Program based on the relevant Part 96 of the CFR and associated technical best practices for the CBRS. For ease of description, the following FIG. 2 discussion references a single CBSD; however as discussed later, a Domain Proxy (DP) may be substituted to efficiently handle messages from multiple CBSDs.

First, the Enterprise Operator (or other CPI) 201 commissions the CBSD 203 by loading information 211 regarding the CBSD 203 into the SAS 207. Particularly, information 211 for the CBSD is entered via a secure portal 202 into the database in the SAS 207. After all information has been entered 211 and approved, the CBSD 203 makes a Registration Request 213. The SAS performs CBSD registration 214, and the SAS then sends a Registration Response 215. If registration 214 is successful, the CBSD 203 is in the registered state.

Once registered, the CBSD 203 can now make a Spectrum Inquiry Request 217. The SAS 207 performs a Channel Availability Assessment 218 and then sends the results to the CBSD 203 in a Spectrum Inquiry Response 219. Based upon the information in this response 219, the CBSD 203 requests a spectrum grant with a Grant Request 221. The SAS 207 then performs channel access assessment 222, and then sends a Grant Response 223. If a spectrum is granted, before commencing transmission, the CBSD 203 must send a Heartbeat Request 225 to the SAS. At 226, the SAS 207 resets the Heartbeat Interval Timer and sends a Heartbeat Response 227 to the CBSD 203. The CBSD 203 can now commence transmission.

Reference is now made to FIG. 3 to illustrate advantages of using a Domain Proxy (DP). In a network that has multiple CBSDs 303, 305, a DP 301 acts as a proxy for all SAS transactions; particularly, the DP 301 manages all the transactions by proxying the messages and facilitating functions such as channel arbitration, proxied heartbeat responses, and so forth. Generally, a DP 301 is a logical entity that can represent one or more CBSD(s) 303 to the SAS 207. Advantageously the DP 301 presents a consistent and secure interface to the SAS 207 that can convey all messages pertaining to the SAS-CBSD interface 307 for client CBSDs 303. In large enterprise deployments, a DP 301 may be deployed to minimize the high count of SSL/TLS connections that would otherwise be required for individual CBSDs, such as the CBSD 305.

The management system works in a straightforward manner after the CBSDs 303, 305 are deployed to their position. However, issues can arise before and during deployment of the CBSDs 303, 305. As discussed above, a CBSD 303, 305 of a CBRS must first register itself with the SAS 207 responsible for allocating spectrum within the CBRS band before it can request a grant of spectrum. As part of the registration process, the CBSD is mandatorily obligated to notify the SAS of its location (in GPS coordinates); without the location information, the SAS will reject the registration. The rules that govern the operation of a CBRS require that a CBSD have a position location capability and that it be able to report its location to a specified accuracy of ±50 meters horizontal and ±3 meters vertical. In many cases, until the CBSD is at the enterprise location, the final position of the CBSD is not known to the specified accuracy; therefore, the CBSD cannot report a position because it does not have a position yet.

Furthermore, in any network deployment, after the BS/APs are installed, it is necessary to understand the RF environment in order to properly assign channels and reduce interference. This is particularly important in the CBRS band because several radio access technologies, such as 4G LTE and 5G NR, can be deployed within the same band. For example, if LTE is the chosen radio access technology it is necessary to understand the RF environment before assigning the correct frequency channel and other operational parameters, such as Physical Cell Identity (PCI), Zadoff-Chu Root Sequence Index (RSI), and others. Particularly, it is important to determine the RF environment that would exist within the enterprise when all the enterprise radio nodes commence transmission, and not just the RF environment that would have existed before the enterprise radio nodes commence transmission. Colloquially, this can be termed a "chicken-and-egg" problem: to learn the RF terrain, the radio nodes need to transmit on a frequency channel; but in order to transmit, the SAS must allocate a channel to the enterprise even before knowing the radio nodes' locations or measurements from the radio nodes.

Accordingly, there is presently a desire for a methodology to resolve the dilemma posed by the need to have a new node transmit its location to complete the registration prior to being authorized to transit.

SUMMARY

Various embodiments of a system for deploying Base Stations/Access Points (BS/APs) in a wireless communications network are disclosed. The deployment system is useful in a managed radio communication environment, such as the Citizens Broadband Radio Service (CBRS) that is managed by a Spectrum Management Entity (SME). In some embodiments of the disclosed method and apparatus, the BS/APs comprise Citizens Broadband radio Service Devices (CBSDs), that are deployed in 4G and 5G enterprise communications networks.

In accordance with some methods, BS/APs are deployed in a private wireless communications network that operates within a frequency spectrum managed by a management entity (such as an SME). Generally, a private wireless communication network operates within a private location area, such as a facility of an enterprise or business. The BS/APs to be deployed are installed on location after the preregistration process. Some embodiments of the disclosed method include the steps of obtaining registration information specific to the BS/APs, determining location coordinates at a location within the private location area and associating the location coordinates with registration information for the BS/APs. Since the location coordinates at which the BS/APs will be installed may not yet be known, the address of the private location area may be sent to a geocoder to obtain location coordinates. This address is only approximate. Accordingly, it can be used for preregistration and Radio Environment Monitoring (REM) measurements, but is not used for the communications that will occur once the network is operating normally. These approximate coordinates for each of the BS/APs are updated with accurate location coordinates before normal network communications commence.

The registration information for at least one of the BS/APs is communicated by a Domain Proxy (DP) in a registration request to the management entity. The management entity can then approve registration. Messages are exchanged between the DP and management entity to make a spectrum inquiry, and eventually a spectrum grant is received from the management entity. Accordingly, the registration request, and communication with the management entity may be generated and communicated by the DP to the management entity on behalf of all the BS/APs in the network. The DP then periodically exchanges heartbeat messages with the management entity to maintain an active grant to reserve the spectrum.

After the BS/APs are installed, REM measurements are taken. Taking the REM measurements includes transmitting a signal from one of the installed BS/APs and simultaneously measuring the power from said signal received at the remaining non-transmitting BS/APs, repeating the transmitting step for each of the BS/APs until each BS/AP has transmitted and measurements have been received by the remaining BS/APs, and then collecting and processing the measurements to determine the RF environment of the private wireless communications network. After the RF environment is known, the BS/APs can be provisioned to mitigate interference and commence transmission.

The private wireless communications network may be an enterprise network, which operates at an enterprise location such as a factory, research and development facility, any large building, or other area in which communication networks are useful.

In one embodiment, a communications system for an enterprise wireless communications network includes a plurality of BS/APs to be installed at an enterprise location. The communication system includes a subscriber database that holds subscription data including registration information for each of the plurality of BS/APs in communication with a Domain Proxy (DP) that is connected to the subscriber database. The subscriber database is configured to receive registration information. The DP is in communication with a Spectrum Management Entity (SME), and is configured to receive location coordinates for the enterprise location and utilize the coordinates in a registration request prior to installation of the BS/APs. Subsequent to installation of the BS/APs, the DP directs the BS/APs to take REM measurements at the enterprise location. The communication system may comprise an Auto Configuration Server (ACS) connected to the DP and in communication with the BS/APs. Hence the DP may direct the BS/APs to take REM measurements via the ACS. The ACS is configured to provision the BS/APs for taking REM measurements. Examples of provisioning parameters for REM include channel numbers (EUTRA ARFCN), PCI, and so forth.

The communication system may also comprise a Self Organizing Network (SON) unit connected to determine the RF environment responsive to REM measurements from the BS/APs.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 4:
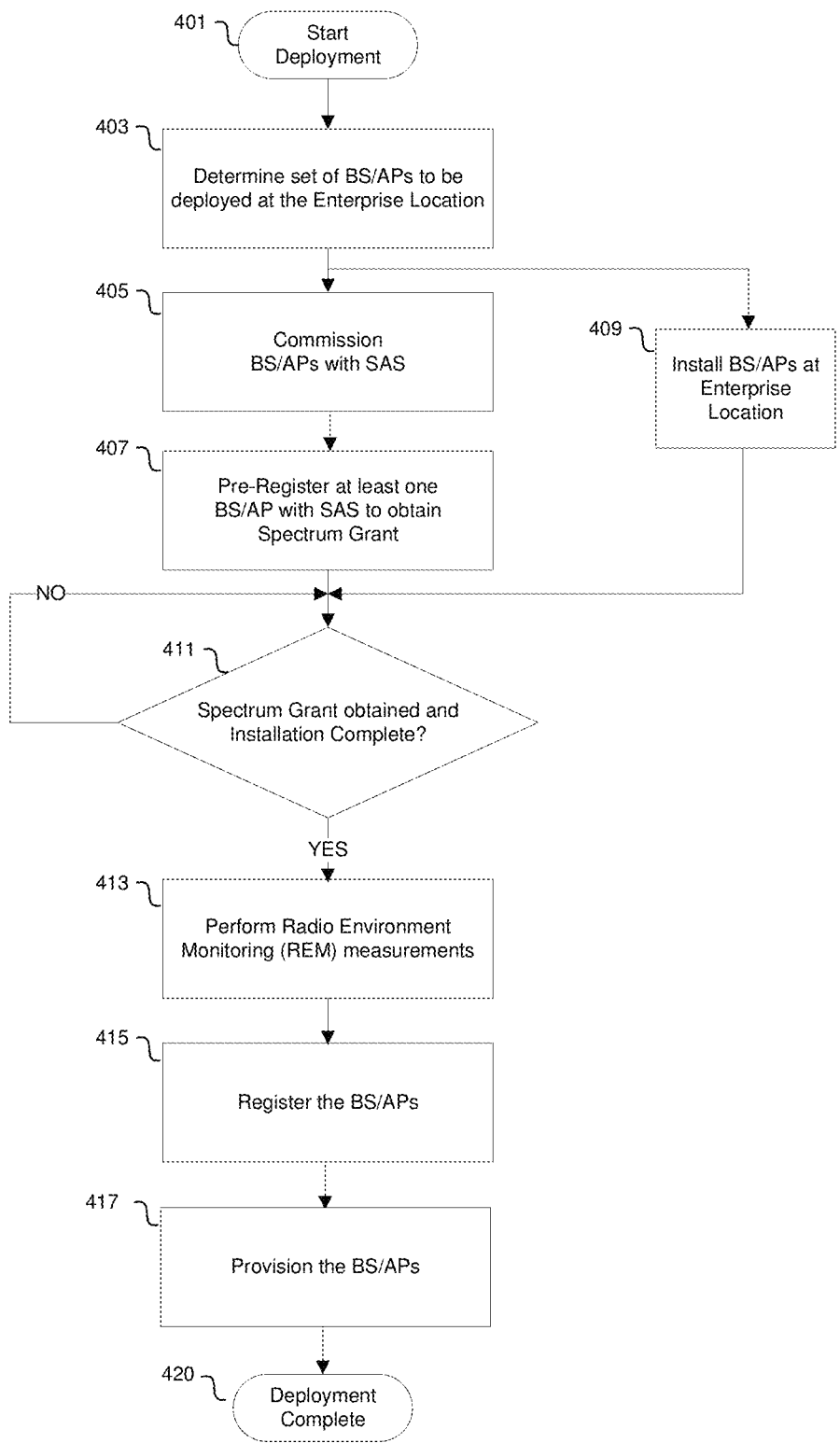
FIG. 4 is a flow chart that illustrates steps to deploy a plurality of BS/APs such as CBSDs in an enterprise network in accordance with the CBRS interface specification.

FIG. 4 is a flow chart that illustrates steps to deploy a plurality of BS/APs such as Citizen's Broadband radio Service Devices (CBSDs) in an enterprise network in accordance with the Citizens Broadband Radio Service (CBRS) interface specification. An enterprise network is one type of private network, and although described in the context of an enterprise network, the principles disclosed herein can also apply to any private network. Private networks are operated for use within a limited area by a limited group of authorized users, whereas public networks generally cover a larger area and are open for use by anyone that subscribes to the service by the network operator. An enterprise network is created at an enterprise location such as a warehouse, factory, research center or other building, and is usually operated by an organization for use by that organization. Other types of private networks may be operated by a private network manager for use by more than one organization.

Figure 5:
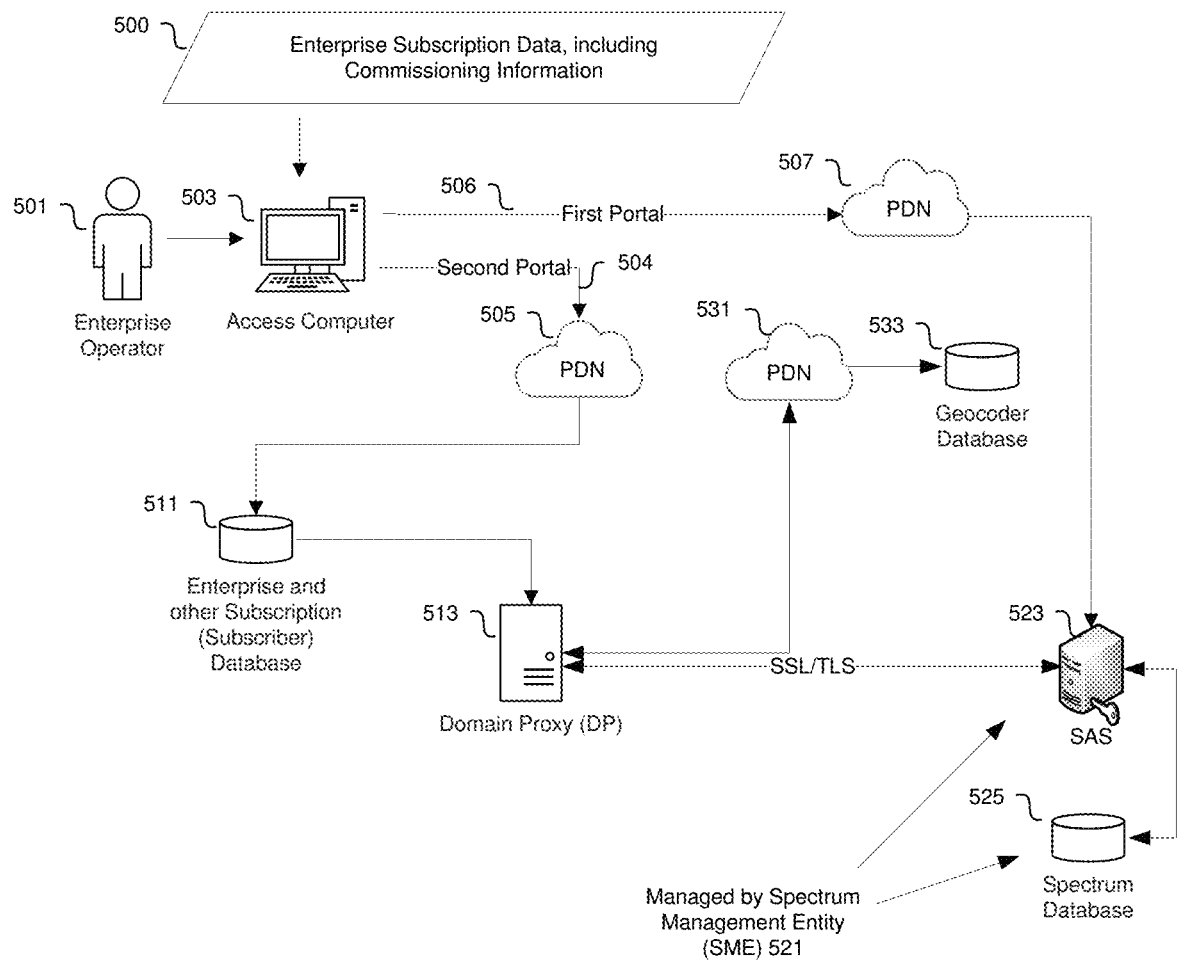
FIG. 5 is a diagram of a communication system by which an enterprise operator provides subscription data and commissioning information to an SAS and a Subscriber Database.

For purposes of description, the term deployment is used to describe the process by which the BS/APs in the network are set up to be ready for operation within the network. In the following, reference will be made to both the flow chart of FIG. 4 and block diagram of FIG. 5. FIG. 5 is a diagram of a communication system in which an enterprise operator provides subscription data and commissioning information to an SAS and a Subscriber Database.

A deployment operation for deploying a BS/AP starts at 401. An enterprise operator 501 or other appropriate organization or individual identifies the installation requirements and designs the network accordingly. Designing the network includes determining how many BS/APs (also referred to as CBSDs) will be required to provide service for a set of use cases and/or applications required by the enterprise and the locations of those BS/APs within the enterprise network (STEP 403). This determination may be made with the assistance of any appropriate planning tool. This determination (STEP 403) can be performed at a location remote from the enterprise location; i.e., it is not necessary for enterprise operator 501 or an access computer 503 coupled to one or more secure user portals 504, 506 through which the operator 501 communicates, to be physically located at the enterprise location, which advantageously allows remote management.

The network installation may be new or it could be an improvement to a previous installation. In either case, it is likely that new and/or updated BS/APs will be required. It should be noted that FIG. 5 does not depict any of the BS/APs, as they will typically not yet be present in the network. Once the number and location of the BS/AP 704APs have been determined (STEP 403), the necessary individual BS/APs can be purchased. This is typically necessary in order to attain and to provide identification information (i.e., to determine commissioning information 500) that is required to commission the BS/APs (STEP 405) and to perform pre-registration (STEP 407) for each of the BS/APs.

Advantageously, commissioning (STEP 405) and pre-registration (STEP 407) do not require that any of the BS/APs be physically installed or to transmit, which efficiently allows a significant portion of network setup to be performed before actual physical installation of the BS/APs within the enterprise location. In other words, installation of the BS/APs (STEP 409) can proceed in parallel with commissioning (STEP 405) and pre-registration (STEP 407), or at any convenient time.

Referring to FIG. 5, the BS/APs are commissioned (STEP 405) by the Spectrum Management Entity (SME) 521. The SME is coupled to the SAS 523 and a Spectrum Database 525. The commissioning stage (STEP 405) is one of the early steps in an enterprise deployment. As discussed above, this step typically occurs prior to BS/AP installation within the enterprise and the subsequent enterprise "bring-up" (i.e., the network being brought on line).

The access computer 503 is connected, via the first secure user portal 504 and a first Packet Data Network (PDN) 505 to the SAS 523. The PDN 505 is a generic network that provides data services. In some embodiments, packet switching involves data transmission wherein a message is broken into a number of parts that are sent independently, over whatever route is optimum for each packet, and reassembled at the destination. Utilizing the first secure user portal 504, the enterprise operator can use the access computer to securely transmit the collected commissioning information over the PDN 507 to the SAS 523. The commissioning information 500 includes subscription data relating to the enterprise and the BS/APs. Particularly, in the CBRS network, the commissioning information includes the number of CBSDs, the FCC Identification for each of the BS/APs, the transmission class of each of the CBSDs, the enterprise User Id, serial numbers of each of the CBSDs, their stock keeping numbers (SKU), and the physical address 112 where the enterprise CBSDs will be deployed. The commissioning information shown above is a minimum mandatory information and not exhaustive.

In FIG. 5, the access computer 503 is shown connected, via the second secure user portal 506 and a second PDN 507 to an Enterprise and other Subscription (Subscriber) Database 511 which is managed by a network operator/network manager, which may be a Certified Professional Installer (CPI), certified in accordance with the CBRC rules. Advantageously, by using the second secure user portal 506 to store subscription data in the subscriber database 511, the system can be made aware of the entire set of BS/APs that will belong to an enterprise much before the BA/APs are installed and powered on for the first time.

Referring to FIG. 5, a Spectrum Management Entity 521 is connected to and manages the SAS 523 and the Spectrum Database 525. The SME 521 must approve the commissioning information for each BS/AP, and the enterprise operator must ensure that the enterprise BS/APs, enterprise User Id, FCC Id and serial numbers of the BS/APs are approved with the SME 521. The enterprise operator 501 may achieve this approval process through the first secure user portal 504. Alternatively, this procedure may also be done on behalf of the enterprise operator by the network operator/network manager, utilizing the data stored in the Subscription Database 511 and the SSL/TLS connection between the Domain Proxy (DP) 513 and the SAS 523.

The methods indicated above for subscription data collection, commissioning and approval are simply an example and other variants are possible; for example, the network operator/network manager may perform any of these functions on behalf of the enterprise operator.

Referring again to FIG. 4, once the commissioning (STEP 405) is complete, pre-registration begins (STEP 407), in which at least one BS/AP is preregistered with the SAS 523 in order to get a spectrum grant for taking Radio Environment Monitoring (REM) measurements.

Figure 3:
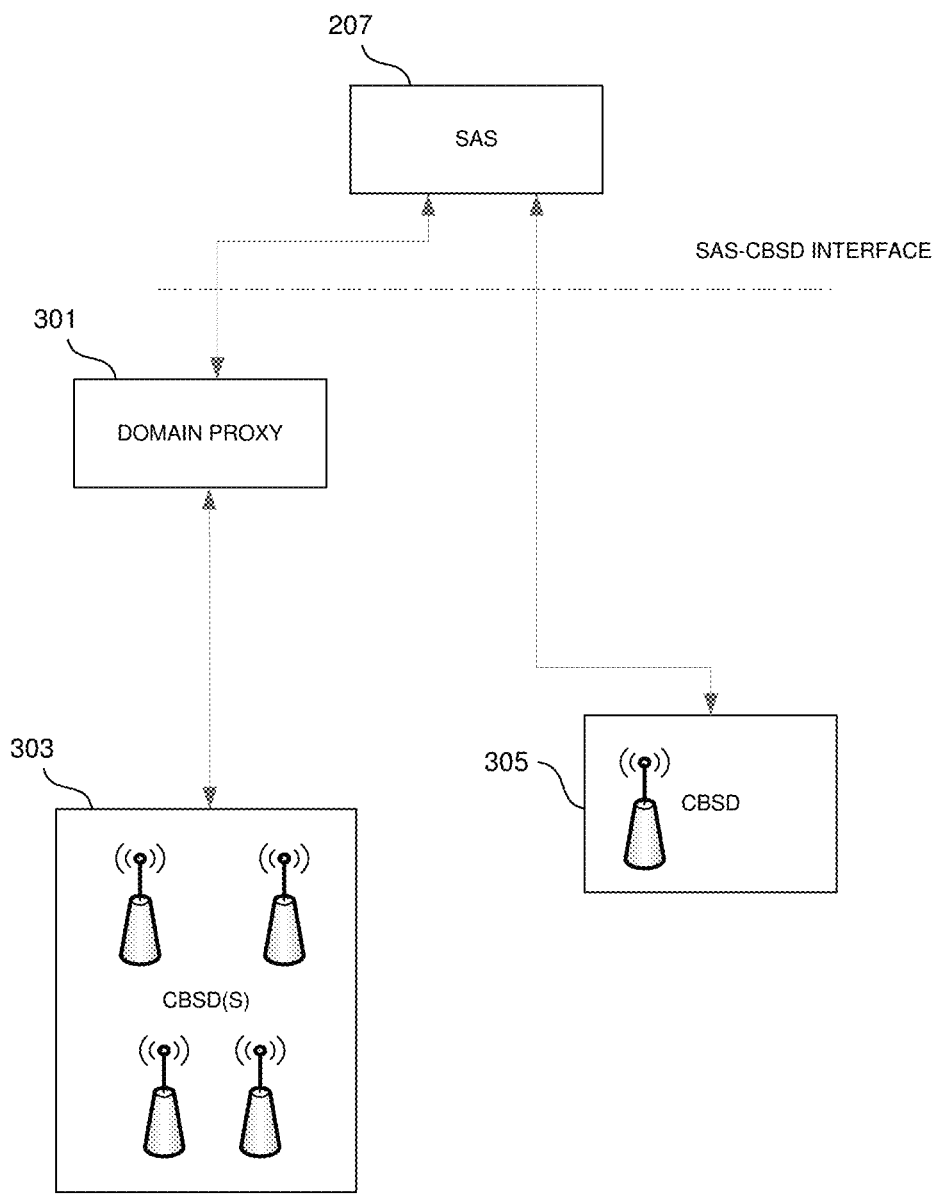
FIG. 3 is a diagram in which a plurality of CBSDs utilize a Domain Proxy (DP) to communicate with the SAS, also shown for comparison is a direct connection in which a CBSD communicates directly with the SAS.

Domain Proxies (DPs) and their advantages have been discussed and particularly with reference to the DP 301 discussed with respect to FIG. 3. Referring now to FIG. 5, the DP 513 acts as a proxy for all SAS transactions regarding the BS/APs. One advantage is that in large enterprise deployments, a DP is often deployed to minimize the high count of SSL/TLS connections that would otherwise be required for individual CBSDs. The DP 513 manages all the transactions by proxying the messages (i.e., acting to consolidate and relay individual messages in a proxy message) and facilitating functions such as channel arbitration, proxied heartbeat responses and so forth.

The DP 513 is connected to the subscriber database 511 to fetch subscription details from subscriber database 511. The DP 513 and subscriber database 511 are within the network operator's trusted environment. Accordingly, messages between them can be transmitted securely. Fetching (i.e., requesting information or information pushed out) may occur periodically, or on request, and may occur over any protocol. Alternately, the subscription database 511 may perform an event-based push, for e.g., when new enterprise details (or) updates to existing enterprise details are entered into the database. The records fetched by DP 513 (or pushed into it) include enterprise details and the enterprise address. Contents of the records fetched may be used in the pre-registration process.

Figure 1:
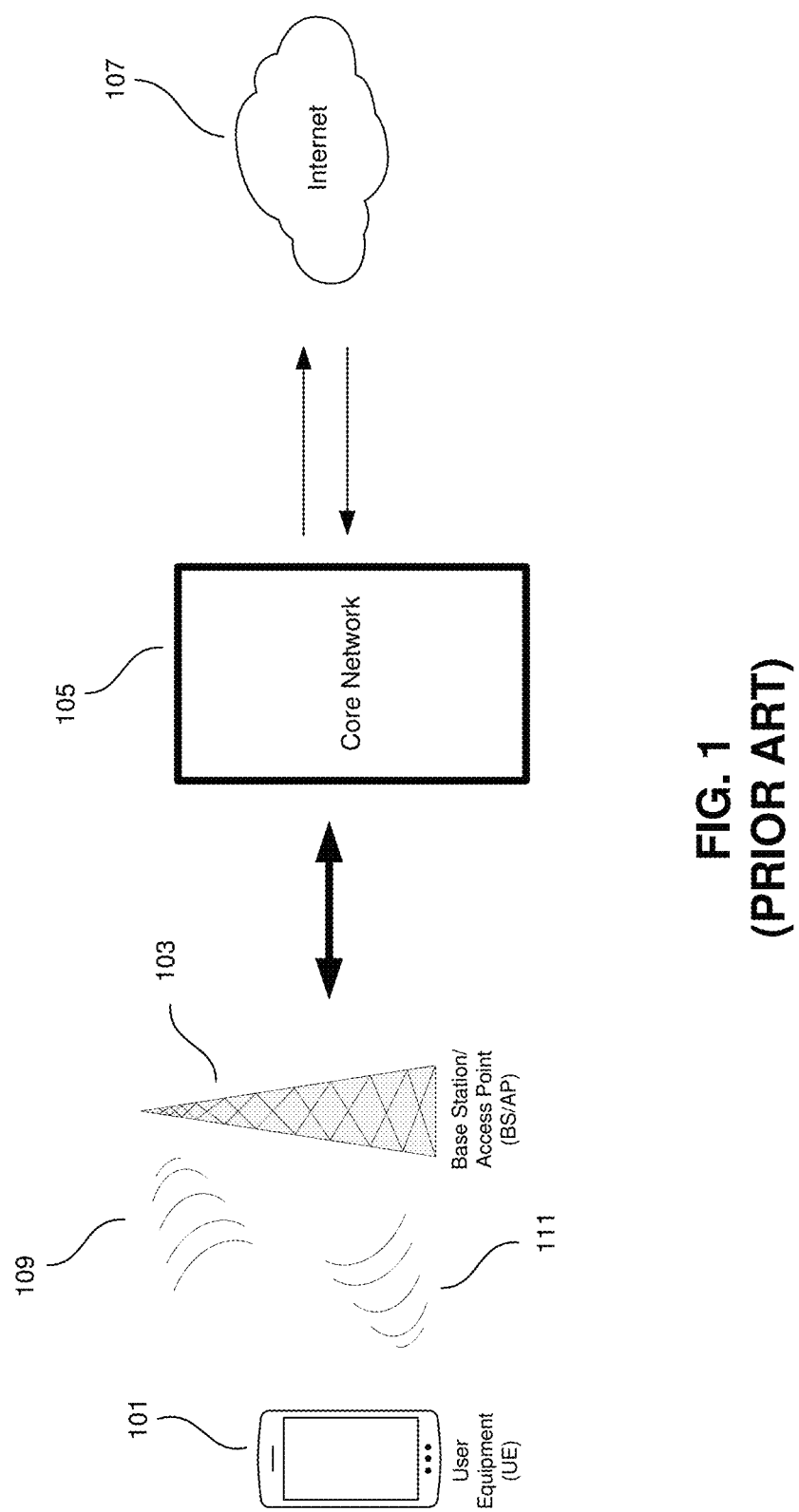
FIG. 1 is an illustration of a basic configuration for a communication network, such as a "4G LTE" (fourth generation Long-Term Evolution) or "5G NR" (fifth generation New Radio) network, in which user equipment (UE) communicates with a base station/access point.
Figure 2:
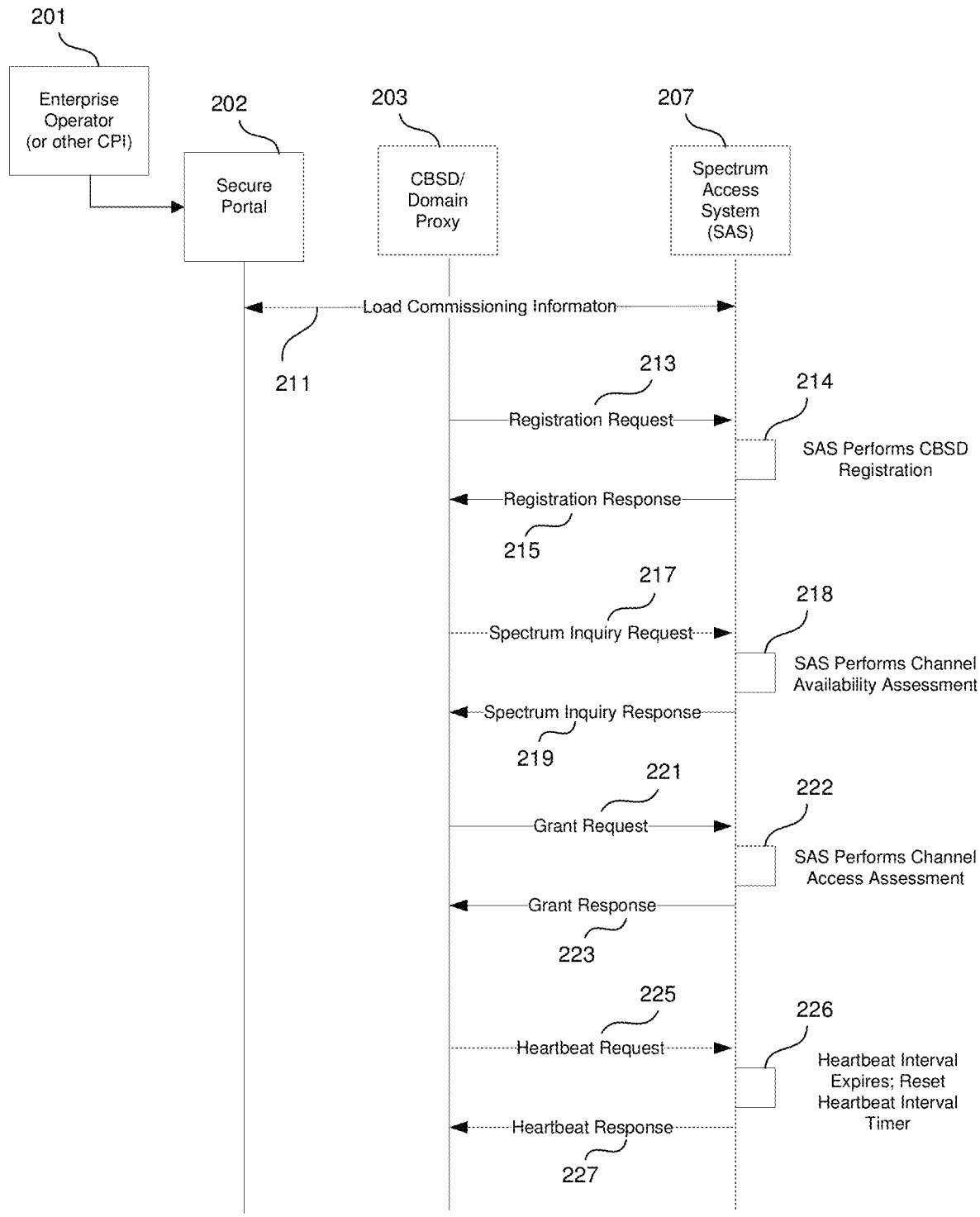
FIG. 2 is an illustration of a prior art message flow between a CBSD and an SAS to register the CBSD, obtain a spectrum grant, and maintain the grant.

In pre-registration (STEP 407), the DP 513 initiates the registration process described with reference to FIG. 2, in order to obtain a spectrum grant. As part of the registration process the DP transmits a registration request to the SAS 523. As part of this request, the DP 513 (on behalf of the BS/AP) is mandatorily obligated to notify the SAS 523 of the BS/AP's location (in GPS coordinates). Without the location information, the SAS 523 will reject the registration. However, at the time the pre-registration process is initiated, the final position of the BS/AP is usually not known, and therefore the DP 513 cannot report a position to the required accuracy because it does not have a position yet. In order to report a position, the DP 513 obtains the address of the enterprise and connects to a geocoder database 533 via a third PDN 531. The geocoder 533 performs a reverse coding of the enterprise address (e.g., a Google geocoder) to obtain coordinates to provide with the registration request. The geocoder 533 converts the enterprise address into a coordinate location (e.g., latitude and longitude). It should be noted that the location accuracy at this point is relatively unimportant because the location is required only for reserving the weakest channel for use by the closest BS/AP in the enterprise, and because the resulting pre-registration spectrum grant will only be used for short periods while taking REM measurements, not for normal network operation.

As part of the registration request to the SAS 523, the DP 513 provides the enterprise "User ID" and a "groupParam object" with reason INTERFERENCE_COORDINATION. By setting the reason to INTERFERENCE_COORDINATION, the DP 513 indicates that it will manage channel arbitration (possibly including channel selection) and that SAS 523 should simply supply a list of frequency channels yet available from which to select.

To complete pre-registration (STEP 407) and receive a Spectrum Grant, the DP 513 and the SAS 523 exchange message flows beginning with the registration request 213 and continuing with the spectrum inquiry 217, spectrum grants 221 described with reference to FIG. 2 and in the CBRS interface specification. After pre-registration (STEP 407) is complete, the DP 513 has received a Spectrum Grant (STEP 411) that the DP513 maintains for use in taking subsequent REM measurements (STEP 413). Particularly, at the end of the Grant Response 223, the Heartbeat Request message 225 is transmitted by the DP 513 for each BS/AP it had registered and continues to do so every Heartbeat Interval, even though the BS/APs are not transmitting and in some embodiments, may not even be powered-on.

Before operation can determine whether a Spectrum Grant has been obtained and installation is complete (STEP 411), the BS/APs must be installed in their location at the enterprise location installation (STEP 409). In this step, each BS/AP is installed at its desired location, connected to power, and may be tested to some extent. However, the BS/APs cannot begin to transmit until authorized by the DP 513. Each installation will have different requirements and may utilize different construction methods.

Figure 6:
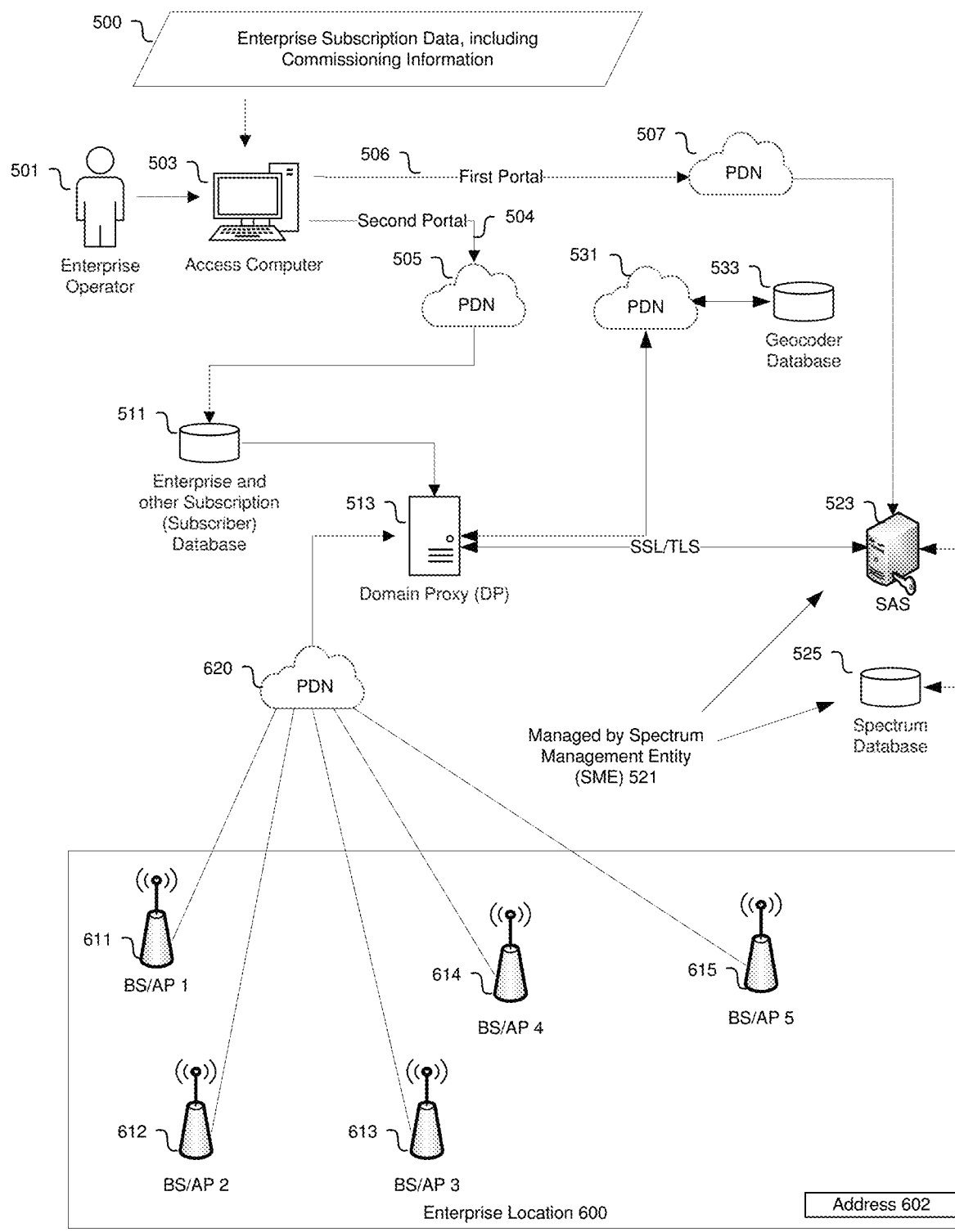
FIG. 6 is diagram that illustrates a plurality of BS/APs installed at an enterprise location.

FIG. 6 is diagram that illustrates a plurality of BS/APs 611, 612, 613, 614, and 615 installed at an enterprise location 600 (STEP 409). As shown, the BS/APs 611, 612, 613, 614, and 615 are installed at the enterprise location that has an enterprise address 602, which is utilized in pre-registration (STEP 407). As shown, five BS/APs are installed, including BS/APs 611, 612, 613, 614, and 615; other implementations may include more or less BS/APs. As mentioned above, none of the BS/APs are allowed to begin transmission until instructed by the DP 513. The DP 513 may instruct the BS/APs directly or via the ACS (903 (see FIG. 9). Each of the BS/APs 611, 612, 613, 614, 615 is connected via any appropriate connection (e.g. wireless, Ethernet, fiber optic, or other connection) to a fourth PDN 620, which is in turn connected to the DP 513.

Referring briefly back to FIG. 4, after pre-registration (STEP 407) and installation (STEP 409) are complete, and the DP 513 has a spectrum grant (STEP 411), operation can proceed to allow REM measurements to be taken (STEP 413). REM measurements are taken to learn the RF terrain. To do this, the BS/APs 611, 612, 613, 614, and 615 need to transmit on a frequency channel. The REM measurements are taken under the control of the DP 513. Before transmission can begin, the SAS 523 must allocate a channel to the enterprise network without knowing the BS/APs locations or measurements from the other BS/APs.

Figure 7:
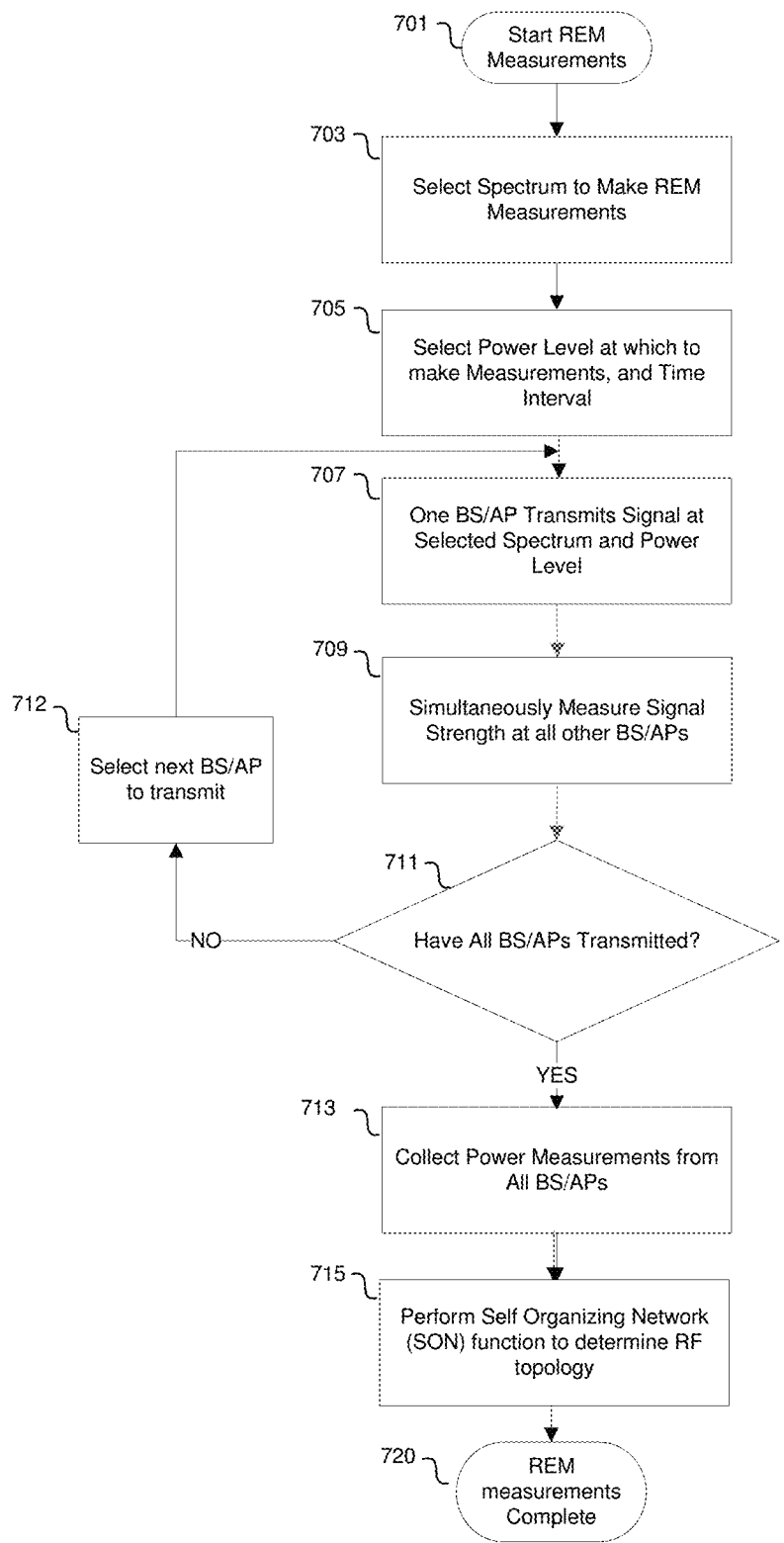
FIG. 7 is a flow chart that shows operations to take REM measurements.

FIG. 7 is a flow chart that details the process for taking REM measurements (STEP 413). The process for taking REM measurements (STEP 413) begins (STEP 701) and the DP 513 selects a spectrum with which to take all the REM measurements (STEP 703). Note, the DP 513 may be aware of other CBRS band BS/APs that may already be in existence in the nearby area. If DP 513 is aware of nearby BS/APs, it performs an algorithm that determines the best frequency channel on which to take REM measurements by the enterprise BS/APs. The DP 513 ensures that all BS/APs operate within the specifications granted by the SAS 523 (e.g., that the BS/APs operate in frequency channels that are within the spectrum allocated by the SAS 523).

A power level and time interval is selected for the transmission of signals to be used in taking the REM measurements (STEP 705). Typically, the power level will be as high as possible without violating any known restrictions. The time interval may be typically on the order of a few seconds (e.g. 5-6 seconds), which is long enough to take REM measurements, but sufficiently short to avoid significant unintended interference with other systems nearby that may or may not be known to the DP 513. Alternatively, the time interval may be determined by monitoring the BS/APs that are not transmitting.

Next, one of the BS/APs transmits a signal at the selected spectrum and power level for the selected time interval (STEP 707). Simultaneously, the remaining BS/APs are made aware of the selected spectrum and measure the signal strength at their location (STEP 709). Next, a determination is made as to whether or not all the BS/APs have transmitted (STEP 711). If not, then the next BS/AP is selected to transmit (STEP 712), and the transmission and measuring (STEPS 707 and 709) are repeated. This round robin loop continues until all BS/APs have transmitted.

Figure 8A:
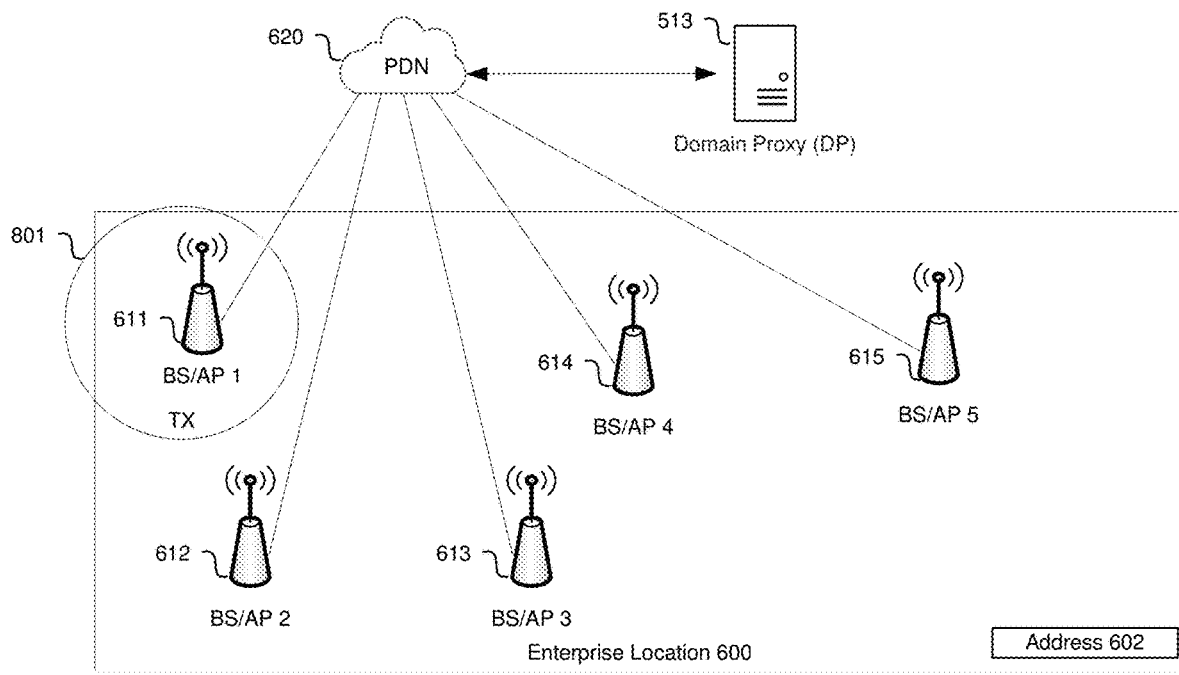
FIGS. 8A, 8B, 8C, 8D, and 8E are a series of diagrams of an enterprise location with installed CB/SDs that show the round robin technique of taking REM measurements.
Figure 8B:
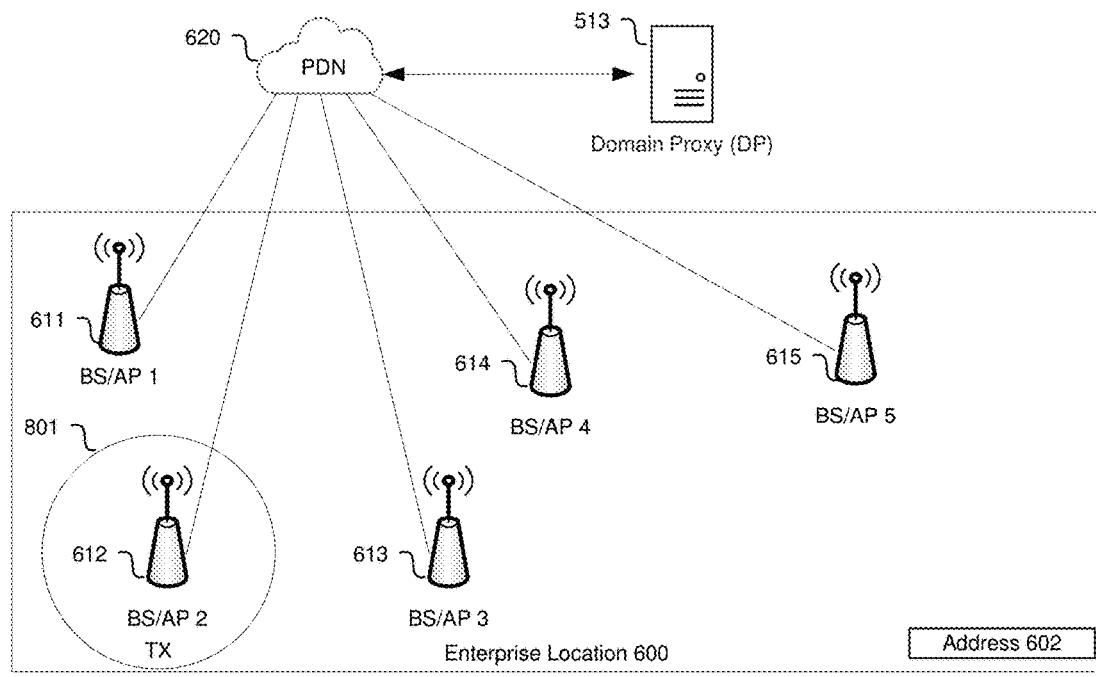
Figure 8C:
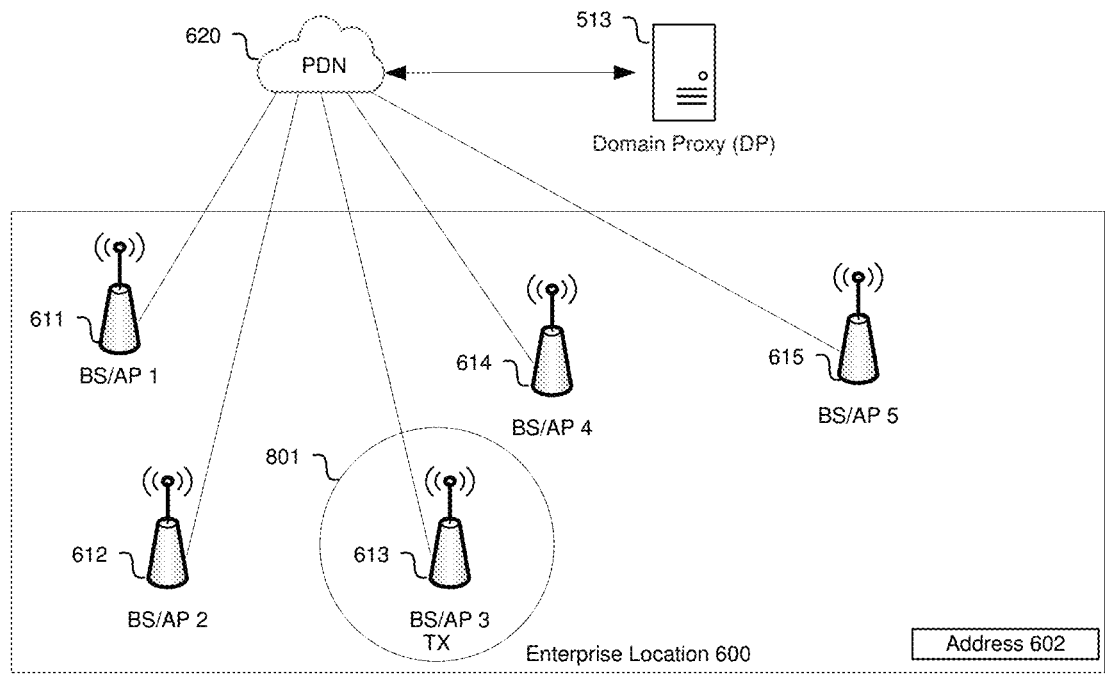
Figure 8D:
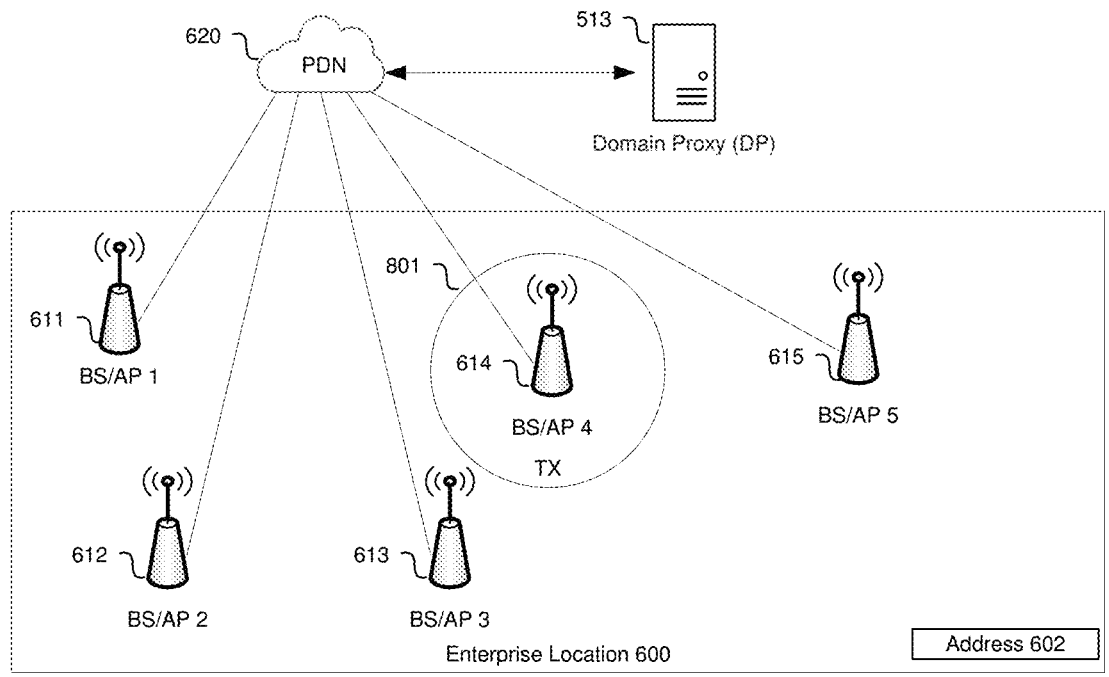
Figure 8E:
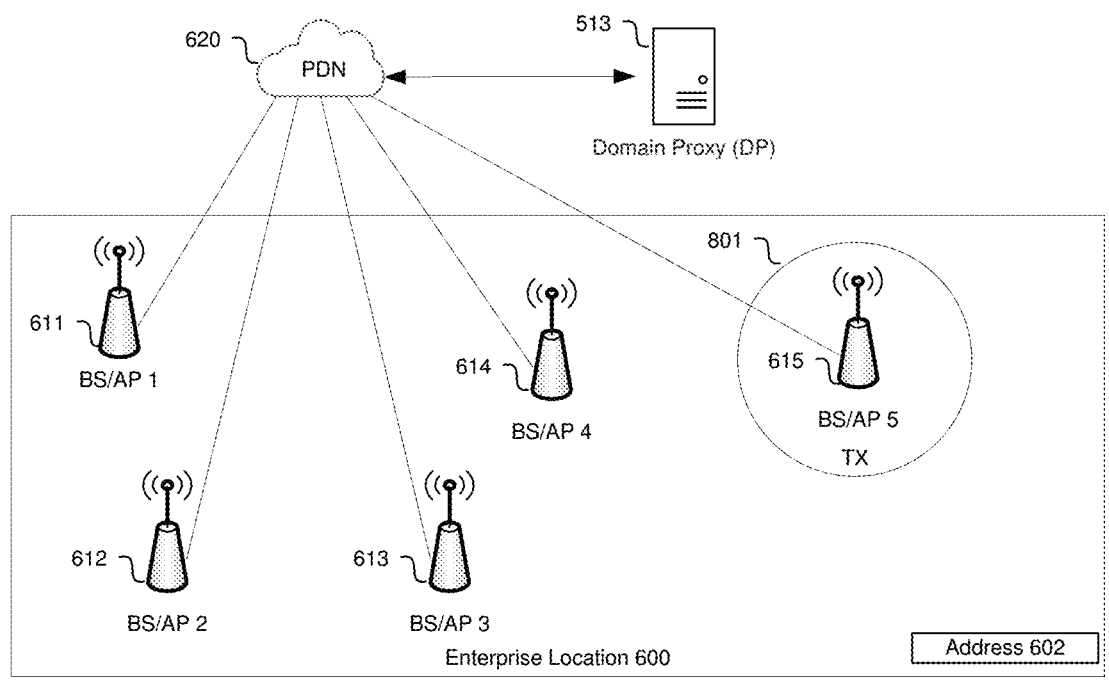

FIGS. 8A to 8E are a series of diagrams that show the round robin technique of taking REM measurements. In FIG. 8A, a circle 801 indicates that the first BS/AP 611 is transmitting on a selected spectrum, and the remainder of the BS/APs 612, 613, 614, 615 are listening to the same selected spectrum. In FIG. 8B, the circle 801 has been moved to the second BS/AP 612 to indicates that it is transmitting, and the remainder of the BS/APs 611, 613, 614, 615 are listening. This pattern continues similarly in FIG. 8C for the third BS/AP 613, in FIG. 8D for the fourth BS/AP 614, and in FIG. 8E for the fifth BS/AP 615. At that point, REM measurements have been taken from all BS/APs 611, 613, 614, 615 at the enterprise location. In addition to measuring the selected spectrum referred to above, each of the BS/APs may also be required to measure the RSSI of the entire CBRS band.

Figure 9:
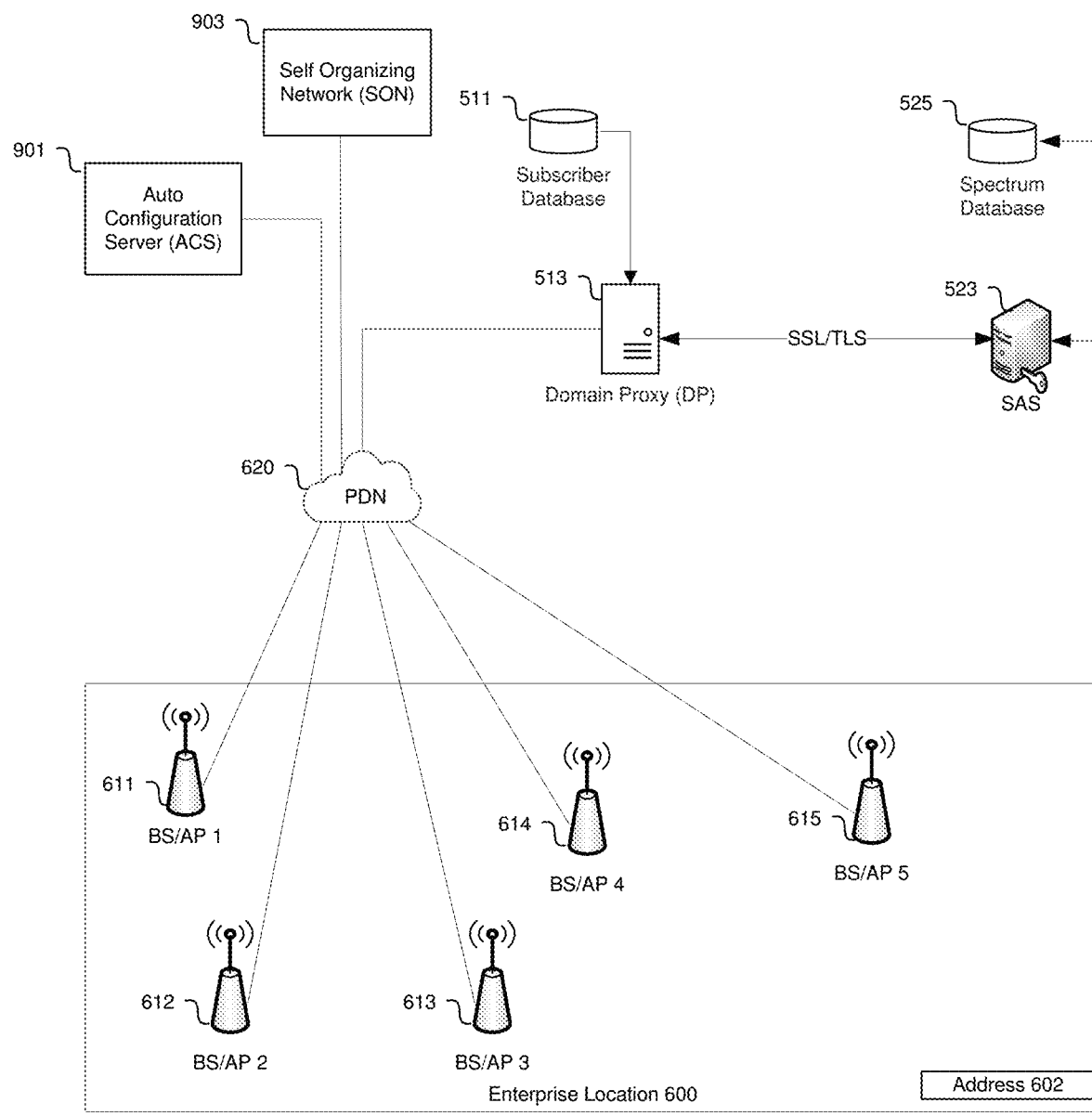
FIG. 9 is a diagram showing BS/APs installed at an enterprise location, and also showing a Domain Proxy, an ACS, and a SON connected via a PDN to the BS/APs.

Referring to FIG. 7 and FIG. 9, the REM measurements that were taken (STEP 709) are from all the BS/APs 611, 613, 614, 615 (STEP 713). This step may be performed by an Auto Configuration Server (ACS) 901. In some embodiments, the ACS 901 is connected via the fourth PDN 620 to the BS/APs 611, 613, 614, 615 in the Enterprise Location. The ACS 901 performs configuration management functions and in one embodiment resides in a Programmable Service Edge (PSE). The ACS 901 provisions the BS/APs using a protocol laid out in an industry standard presented in a document entitled "Technical Report 069" (TR-069). TR-069 is a technical specification published by the "Broadband Forum" that defines an application layer protocol for remote management of customer premises equipment (CPE) connected to an Internet Protocol (IP) network. The Broadband Forum is a non-profit industry consortium dedicated to developing broadband network specifications. In some embodiments, the TR-069 protocol employs device models ("data-structures") to provision one or more parameters at the BS/AP, such as setting 3GPP timers and constants, choosing algorithms implemented within a BS/AP, power control parameters, etc. In some embodiments, instead of TR-069, the ACS 901 may choose to provision the aforementioned operational parameters at the BS/AP using alternative methods such as SNMP.

During the round robin technique discussed earlier, each BS/AP is requested to transmit at a fixed (pre-determined) transmit power on the channel that was granted during pre-registration (STEP 407). During the round robin technique (STEP 413), each BS/AP that manages to "receive" the signal from the transmitting BS/AP, stores the measurements taken during REM in a data object. After the entire sequence of the round robin technique is completed, the ACS 901 fetches the data objects by for example performing a TR-069 GetParametersValue method on the data-object which houses the REM results from each BS/AP. GetParametersValue is a remote procedure call described in the standardized TR-069 protocol. In some embodiments, the ACS 901 may fetch the REM data-object via equivalent procedures using SNMP or any alternative.

The union of all REM data from all enterprise BS/APs is input into a Self Organizing Network (SON) Unit 903. The SON Unit 903 is connected via the fourth PDN 620 to the BS/APs in the Enterprise Location. Referring to FIG. 7, the union of all the REM data allows SON Unit 903 to determine a consistent "RF environment" and determine the neighbors of a given BS/AP (neighbor from a "radio" viewpoint and not necessarily Cartesian distance) (STEP 715).

With this knowledge, the SON Unit 903 can determine the separation in frequency that may be required between two "radio" neighbors. At the same time, the SON Unit 903 can identify "distant" BS/APs. In this context, a BS/AP is distant from other BS/APs if it can use (or re-use) the same channel as other BS/APs in the network without creating interference. For example, some BS/APs in the network may have unique antenna patterns which would allow the BS/APs to reuse the same channel. Alternatively, some BS/APs may be sufficiently far from one another that these BS/APs may reuse the same channel.

When the DP 513 receives channel availability information from the SAS following a Spectrum Inquiry procedure, the SON Unit 903 is also able to "allow" allocation of the same channel to two adjacent BS/APs, so long as it determines the "overlap" to be less than a predetermined power. In some embodiments, this can be derived based on strength of signal received from the adjacent BS/AP while taking REM measurements. The DP 513, in conjunction with the SON 903, can determine which channels are to be applied to each CBSD and transmits the Grant Requests appropriate for each CBSD to the SAS.

Allowing the selection/allocation of the same channel to adjacent BS/APs using the evaluations mentioned above creates an efficiency that makes additional spectrum available, even as BS/AP density increases within the enterprise.

One additional advantage of using a DP (other than the pre-registration) is that it can determine the "minimal" number of channels to operate an arbitrarily large enterprise network (with N BS/APs).

After the REM measurements have been taken and the SON Unit has performed its operations, the enterprise network is ready for normal operation. Before operation, each of the BS/APs must be registered as shown in FIG. 2, and as part of the registration process, the location of each BS/AP must be supplied in the registration request. Accordingly, the BS/APs must utilize their position location capability, and provide that information to the DP, which will then in turn provide it to the SAS in a registration request. The DP will then manage the registrations and spectrum grants for all the BS/APs and maintain the grants with heartbeat requests in accordance with standards. The BS/APs can then be wirelessly operated to transmit and open communication with any UE's that may be within their range for communication.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for deploying Base Stations/Access Points (BS/APs) in a private wireless communications network that operates within a frequency spectrum managed by a spectrum management entity to prevent interference with neighboring wireless communication devices in one or more nearby wireless networks, the private wireless communication network operating within a private location area, comprising:
   obtaining registration information specific to the BS/APs;
   prior to installation of the BS/APs, determining location coordinates at a location within the private location area and associating said location coordinates with registration information for the BS/APs;
   transmitting the registration information for at least one of the BS/APs in a registration request to the spectrum management entity;
   receiving a spectrum grant from the spectrum management entity;
   maintaining an active grant to reserve the spectrum;
   installing the BS/APs within the private location area;
   taking Radio Environment Monitoring (REM) measurements, including:
      transmitting a signal from one of the installed BS/APs and simultaneously measuring the power from said signal received at the remaining non-transmitting BS/APs,
      repeating transmission for each of the BS/APs until each BS/AP has transmitted and measurements have been received by the remaining BS/APs; and
      collecting and processing the measurements to determine the RF environment of the private wireless communications network.

2. The method of claim 1, further comprising:
   determining location coordinates for each of said BS/APs, using said location coordinates to register each of said BS/APs with the management entity;
   receiving a grant of spectrum from the management entity; and
   wirelessly operating said BS/APs in the private wireless communications network utilizing said spectrum.

3. The method of claim 1, wherein said private wireless communications network is an enterprise network.

4. The method of claim 1, wherein the location coordinates are obtained responsive an address of the private location area.

5. A method for establishing an enterprise wireless network at an enterprise location, the wireless network including a plurality of wireless base station/access points (BS/APs) to be deployed at the enterprise location, the BS/APs having a wireless communication capability, the BS/APs connected to a Domain Proxy (DP) that communicates with a Spectrum Access System (SAS) that allocates and grants spectrum to the BS/APs of the enterprise wireless network to manage interference with other networks, comprising:
   pre-registering at least one of the BS/APs, including
      obtaining registration information for at least one of the BS/APs;
      determining location coordinates of the enterprise location, and associating said location coordinates with registration information for the BS/AP;
      transmitting the registration information for the B S/AP in a registration request to the SAS;
   receiving a spectrum grant from the SAS;
   exchanging signals between the DP and the SAS to maintain an active grant to reserve the spectrum;
   installing the BS/APs in the enterprise location; and
   taking REM measurements, including:
      transmitting a signal from one of the installed BS/APs and simultaneously measuring the power from said signal received at the remaining non-transmitting BS/APs; and
      repeating transmission for each of the BS/APs until each BS/AP has transmitted and the remaining BS/AP have received measurements.

6. The method of claim 5, further comprising collecting and processing the measurements to determine the RF environment of the enterprise wireless network.

7. The method of claim 5, wherein the location coordinates are obtained responsive an address of the enterprise location.

8. The method of claim 5, wherein the enterprise wireless network operates in the Citizens Broadband Radio Service (CBRS) spectrum and the REM measurements are made within the CBRS spectrum.

9. The method of claim 5, wherein pre-registration further comprises:
   transmitting a registration request for the BS/AP from the DP to the SAS;
   receiving in the DP a registration response from the SAS indicating that the BS/AP has been registered with the SAS;
   transmitting a spectrum inquiry request from the DP to the SAS;
   receiving, in the DP, a spectrum inquiry response from the SAS including available channels;
   selecting an available channel;
   transmitting a grant request from the BD to the SAS to request a grant of the selected channel; and
   receiving, in the DP, a grant response from the SAS indicating that the grant request has been accepted.

* * * * *